July 9, 1974   NOBUO UKAI   3,823,032
GLASS BOTTLES COATED WITH MULTI-PROTECTIVE FILM LAYERS
Filed July 27, 1972
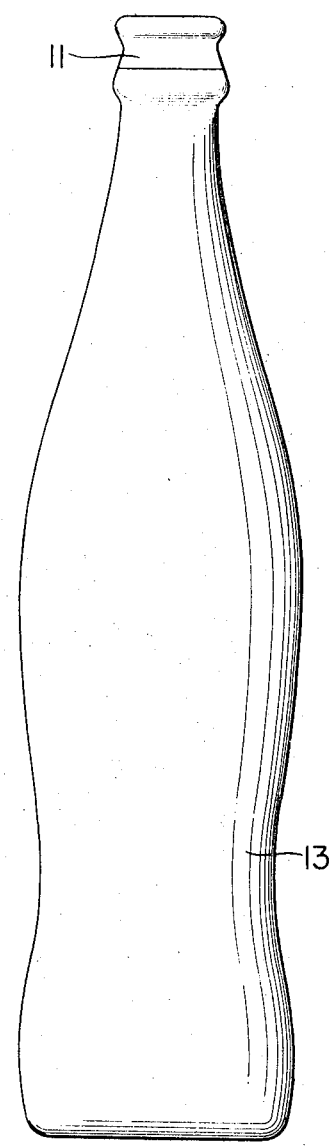
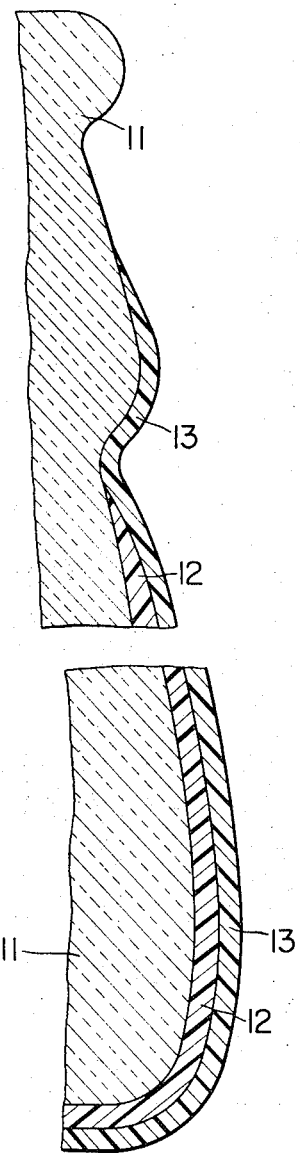

United States Patent Office 3,823,032
Patented July 9, 1974

3,823,032
GLASS BOTTLES COATED WITH MULTI-PROTECTIVE FILM LAYERS
Nobuo Ukai, Yanagawa, Japan, assignor to Tsukihoshi Kasei Kabushiki Kaisha (also known as Moon-Star Chemical Corporation), Kurume-shi, Fukuoka-ken, Japan
Filed July 27, 1972, Ser. No. 275,741
Int. Cl. B44d 1/14; C03c 17/32
U.S. Cl. 117—172   10 Claims

ABSTRACT OF THE DISCLOSURE

A coated glass bottle designed to prevent scattering of the broken glass upon breakage is provided herein, said coated glass bottle containing a multilayer protective film on its surface, the first or inner film being a high polymer having a moderate adhesive strength of e.g. 0.1 kg./cm. to 3.0 kg./cm. with respect to the glass surface and capable of being stretched to an extent greater than 150% of the original length of the film and exemplified by such materials as natural rubber, and an outer protective coating of a synthetic resin covering the entire surface of the inner film, said outer film being such materials as epoxy resins, polyurethane, etc., having a mechanical strength greater than about 200 kg./cm.$^2$, and having such properties as water-resistance, oil-resistance, etc., and wherein the adhesive strength between the inner and outer film is equal to the adhesive strength between the glass bottle and the inner film. A method of preparing said coated bottles is also provided herein. The coated bottles are especially suited for bottling such beverages as beer and carbonated beverages wherein internal gas pressure is exerted on the inner surface of the glass bottles.

BACKGROUND OF THE INVENTION a. Field of Invention

This invention relates to a glass bottle coated with multi-layer protective films of high polymer substances, and a method for producing such coated glass bottle. More particularly, the invention is concerned with a glass bottle for carbonated beverages and beer which beverages are produced under pressurized conditions, said bottle being coated on its outer wall surface with multi-layer high polymer protective films. The present invention also provides for a method for producing the glass bottle coated with such protective films, whereby, when the glass bottle is broken due to internal pressure exerted by pressurized gas within the bottle, or due to external force such as impact, the scattering of glass fragments around the surrounding area can be prevented by the protective covering films.

b. Discussion of Prior Arts

Heretofore, various methods have been implemented to prolong the durability of glass bottles against possible breakage.

U.S. Pat. No. 3,425,859 teaches the application of dual protective, label accepting coatings on the surface of the glass bottles. U.S. Pat. No. 3,471,312 discloses an epoxy coated substrate and method of making the same. However, these two patents teach glass bottles coated on its surface with double coating layers so as to impart thereto scratch-resistance and abrasion-resistance, and a method for producing such bottles.

In reality, breakage of bottles containing carbonated beverages and beer, etc., often takes place due to internal pressure exerted by pressurized gas in the carbonated beverages, as well as by dropping the bottles, and other impacts caused by external force which occur not only in the course of production and distribution of the merchandise product, but also occur as a result of handling the bottles by the consumers. This breakage may result in injuries to the human body.

Thus, while the heretofore known arts are only concerned with prolongation of the durability of the glass bottles by surface treatments as well as by application of a protective film on the bottle surface, the present invention proposes to use multi-layer protective films, of which an inner protective film on the bottle wall surface possesses moderate adhesive strength to the glass surface thereby preventing glass fragments from scattering around the area to hurt human bodies at the time of breakage. In this respect, the purpose and effect of the present invention differ from those of the prior art.

Also, it has been proposed that the adhesive strength of elastic film on the wall surface of glass articles be reduced to some extent with a view towards preventing the broken glass from scattering. For example, U.S. Patent Application No. 645,881 filed on June 14, 1967 (corresponding to Japanese Patent Publication No. 46–42720) discloses a method for producing laminated glass using a poly-urethane resin containing therein antimony, arsenic and phosphor compounds and having an adhesive strength which is slightly weaker than the ordinary adhesive strength of polyurethane resins. U.S. Pat. No. 3,505,160 also teaches a method of achieving optimum adhesive strength in the production of laminated glass articles using polyvinyl butyral by inserting a polyvinyl fluoride film between two glass sheets. In these cases, the adhesion between the glass and the inner-layer is such that, even when the glass is broken, no glass fragments peel off the inter-layer, in which point the prior art methods are different from the present invention in their purposes and effects. The inner elastic film of the present invention should only be sufficient to closely or intimately contact the wall surface of the glass bottle in utilization of the internal stress at the time of film forming, so that the adhesion between the bottle wall surface and the inner film needs not be greatly considered.

SUMMARY OF THE INVENTION

It is therefore the primary object of the present invention to provide a glass bottle, particularly a glass bottle containing carbonated beverages and beer which exert an internal gas pressure against the bottle wall, said bottle being coated on its outer wall surface with multi-layer, high polymer protective films, to prevent the glass fragments from scattering.

It is another object of the present invention to provide glass bottles of the above-described nature coated on its external wall surface with an inner protective film formed from a natural rubber solution or latex, a diene type synthetic rubber solution or latex, a plastisol or an organosol or a powder of polyvinyl chloride, or a solution of a vinyl chloride/vinyl acetate copolymer having moderate adhesion to closely or intimately contact the glass bottle wall surface and having sufficient elasticity, and an outer protective film formed from a solution of a synthetic resin having high mechanical strength, breakage-resistance, scratch-resistance, water-resistance, chemical-resistance, oil-resistance, and weather-resistance. Examples of the outer films are epoxy resins, a one-component moisture-sensitive polyurethane, a urethane rubber containing therein a hardener, polycarbonates, polyesters, polystyrene, or an ethylene-vinyl acetate copolymer.

It is still another object of the present invention to provide a method for manufacturing safe glass bottles coated with such multilayer, protective covering films on the external wall surface thereof.

With this multi-layer, protective covering film, if the glass bottle is broken, the inner protective film separates or exfoliates from the bottle surface along the cracks, while the outer protective film having high mechanical strength maintains its original shape, whereby the glass bottle is broken into pieces within the protective coating film without the glass fragments scattering all around the area as has heretofore been the case.

While the abovementioned elastic high polymer covering film having such moderate adhesive strength to the bottle wall surface prevents the glass fragments from scattering around the area, it is necessary that an overcoat of a synthetic resin film having high mechanical strength be provided on substantially the whole area of the abovementioned elastic protective film closely contacting the bottle wall surface with a view towards increasing the breakage-resistance of the bottle against the internal gas pressure within the bottle and the external impact. The outer film also improves the wet and dry scratch-resistance of the coated film surface, and increases the water-resistance, chemical-resistance, oil-resistance, and weather-resistance of the inner elastic film whereby the ability of the inner film to prevent scattering of the glass fragments becomes remarkably improved.

The foregoing objects and other objects of the present invention will become more apparent from the following detailed description thereof, when read in conjunction with the accompanying drawing.

BRIEF DESCRIPTION OF DRAWING

In the drawing:

FIG. 1 is a side view of a glass bottle coated on its surface with the multi-layer protective covering films according to the present invention; and FIG. 2 is an enlarged, fragmental cross-sectional view of the glass bottle shown in FIG. 1 above indicating a more precise structure of the multi-layer protective covering films.

DETAILED DESCRIPTION OF INVENTION

The high polymer substance suitable for the inner protective film 12 on the surface of glass bottle 11 of the present invention can be selected from a natural rubber solution or latex, a diene type synthetic rubber solution or latex, a plastisol, an organosol, or a powder of polyvinyl chloride, or a solution of a vinyl chloride/vinyl acetate copolymer.

For the natural rubber, a natural rubber latex, or more preferably, a vulcanized natural rubber latex is used.

For the diene type synthetic rubber, those having a "green strength" or a tensile strength after vulcanization of from 100 to 300 kg./cm.$^2$ are most preferable. Examples of such synthetic rubber is a latex of a styrene/butadiene block copolymer such as "Cariflex TR," a product of Shell Chemical Co., Ltd., "Tufprene," a product of Asahi Chemical Industry Co., Ltd., "Solprene" a product of A.A. Chemical Co., etc. These high polymer materials can be used under the same conditions. Also, if the green strength is in the same range as above, polychloroprene rubbers, acrylonitrile-butadiene copolymer rubbers, etc. can also be used.

The vinyl chloride-vinyl acetate copolymers to be used in this invention consists of more than 80% of vinyl chloride and less than 20% of vinyl acetate.

The elongation of the inner protective film is more than 150%, or more preferably, above 200% according to ASTM D.412–65T.

For the fragments of the glass bottle for beer or other carbonated beverages to be prevented from scattering around the adjacent area, when it is fractured due to the internal gas pressure of the carbonated beverage or any external force, the inner film must be capable of absorbing the energy exerted by 3–15 kg./cm.$^2$ of the internal gas pressure of the carbonated beverage. For this purpose, it is necessary that the rubber or rubber-like elastic film be in close contact with the glass bottle surface and that the inner film have a large energy absorption and attenuation function as well as sufficient film elongation. By the elongation of this protective film, the glass fragments are held by this protective covering film so as not to scatter around, while tiny holes are produced at a portion of the coated film, from which pressurized gas is released to lower the internal pressure of the bottle.

In order for the elastic film coated on the surface of the glass bottle to sufficiently absorb energy imparted to the glass fragments by the pressurized gas of the carbonated beverage, this elastic coating film should be capable of being exfoliated or floated from the bottle wall surface with a certain width at the portion of the cracks generated by the breakage. The reason for this is that, if the bottle surface and the elastic film are in the state of being tightly adhered to each other, the elastic film at the portion of the cracks generated in the glass bottle wall cannot elongate freely, so that even by a slight opening of the cracked portion, the elastic film instantaneously fractures beyond its limit of elongation and the fragments of the glass bottle break away.

Contrary to this, when cracks generate in the glass bottle wall due to any external impact or internal pressure, if the coated elastic film is sufficiently free so as to be readily separable from the broken bottle along the cracks generated therein and be freely stretchable at the fractured portion of the glass bottle due to the cracks, the energy of the broken glass fragments due to the pressurized gas within the bottle is substantially absorbed by the elongation of the coated elastic film, whereby the glass fragments can be perfectly held by the protective film. For example, in case the elastic film in contact with at the cracked portion of the glass bottle is tightly adhered to the bottle wall surface, if a width of say 3 mm., for instance, of a broken portion takes in the bottle, the elongation of the elastic film becomes $3/0 = \infty$ with the consequence that the film breaks instantaneously However, if the elastic film at the portion of the cracks in the bottle is not tightly adhered to the bottle wall surface, and can be separated from the bottle wall surface over a width of 1.5 mm., for instance, the elongation of the film under the same condition of breakage as above becomes $3/1.5 = 2$ (times), the elongation of which is well within the limit of the elasticity of the ordinary rubber or rubber-like substance, hence no rupture of the elastic film possibly takes place.

There are various sizes of glass fragments, large and small, resulting from breakage of the glass bottle. Large glass fragments possess large total inner pressure from the pressurized gas, and any one of the sharp edges of the large glass fragments around its periphery causes the elastic film to slightly burst, from which pressurized gas is ejected to reduce the internal pressure of the bottle, while the glass fragments are being held by the elastic film, whereby breaking-away of the glass fragments can be perfectly prevented. In the case of a glass bottle having a low internal pressure, or having no internal pressure at all, or having reduced pressure, the elastic inner film holds the broken glass pieces without bursting any portion thereof.

The adhesive strength of the inner elastic film coated on the surface of the glass bottle should be such that it becomes lower as the gas pressure of beer or carbonated beverages becomes higher. In other words, as the energy of pressurized gas on the glass fragments becomes higher, the coated elastic film at the portion along the cracked lines generated in the bottle should be able to separate from the surface of the glass bottle with as broad a width as possible and be sufficiently elongated. In particular, when a number of crack lines generate in the glass bottle wall and the pressurized gas within the bottle pushes outward on the coated elastic film, the film exfoliates from the bottle surface shearing in parallel along the glass surface, while it is being stretched. Therefore, the adhesiveness between the elastic film and the bottle surface should be lower in its peeling strength when it is elongated substantially in parallel with the glass surface, as opposed to the case where the film is maintained by a peeling method, i.e., at an angle of 90 degrees or 180 degrees with respect to the glass bottle.

The moderate adhesive strength of the inner elastic film with respect to the wall surface of the glass bottle should be from about 2.5 to 3.0 kg./cm. for a glass bottle having no internal pressure at all. For a glass bottle having an internal pressure of 3 kg./cm.$^2$ or so, the adhesive strength should preferably be from 0.5 to 0.3 kg./cm. For a glass bottle whose internal gas pressure is in the range of from 3 to 15 kg./cm.$^2$, the preferred adhesive strength is from 0.3 to 0.1 kg./cm.

However, even if the adhesive strength is low between the inner film and the surface of the glass bottle, it constringes the bottle somewhat tightly upon formation thereof, since, in the course of the coating operation, i.e., dipping the glass bottle in a polymer solution and drying the same after pulling out of the solution, a volume decrease takes place in the coated layer due to the evaporation of solvent. That is, the inner elastic film closely contacts the wall surface of the glass bottle owing to the internal stress at the time of its formation.

While the abovementioned elastic film having moderate adhesion to the bottle wall surface prevents glass fragments from scattering around the adjacent area at the time of bottle breakage, it is necessary to cover this elastic inner film 12 with an overcoat of an outer film 13 of a synthetic resin having high mechanical strength. In this case, there should also exist moderate adhesion between the inner film and the outer film, the bonding strength of which is preferably equal to that between the bottle surface and the inner film.

Control of the bonding strength between the inner film and the outer film is accomplished by the combined use of films having different polarities between them, or by adding an anti-bonding agent to the inner film in a very small quantity to reduce the bonding strength thereof with respect to the outer film, or by increasing the bonding strength of the inner film with respect to the bottle surface by use of a primer.

Examples of combinations of materials for the inner and outer films are as follows: (1) natural rubber or a diene type synthetic rubber or a homopolymer or copolymers of vinyl chloride as the inner film, versus an epoxy resin or a polyurethane or a polycarbonate or a polystyrene as the outer film; (2) natural rubber or a diene type synthetic rubber or a vinyl chloride/vinyl acetate copolymer as the inner film versus a polyester as the outer film; (3) natural rubber or a diene type synthetic rubber or polyvinyl chloride as the inner film versus an ethylene/vinyl acetate copolymer or a polyurethane as the outer film.

For the anti-bonding agent, a silicone oil or a silicone emulsion or a surface active agent is added in a small quantity to the required layer liquid. The quantity of the anti-bonding agent varies depending on the kind of the agent and the combination of the inner film material and the outer film material. Usually, it is from 0.02 to 2.5% with respect to the solid content of the films.

For the primer, a carboxyl-group-introduced styrene-butadiene rubber (SBR) latex, a vinyl chloride/vinyl acetate copolymer introduced thereinto the carboxyl group or hydroxyl group, acrylic resins, epoxy resin-modified polyvinyl chloride, and so forth are used.

The synthetic resins suitable for the outer protective film are selected from those having high mechanical strength capable of increasing breakage resistance, wet and dry scratch resistance, chemical-resistance, oil-resistance, weather-resistance, etc. such as, for example, an epoxy resin, a polyurethane, a polycarbonate, a polystyrene, or an ethylene/vinyl acetate copolymer (ethylene content of 95–60%: vinyl acetate content of 5–40%). The mechanical strength of the outer protective film should be usually 200 kg./cm.$^2$ and above, and the elongation thereof must be smaller than that of the inner protective film. That is, in the case of the glass bottle having internal gas pressure, hence most liable to scatter the fragments, a portion of the outer protective film should be easily broken slightly due to its low elongation to release the pressurized gas outside, while the highly elongable inner protective film is holding the glass fragments. In spite of this slight partial breakage thereof, however, as the outer protective film is superior in its mechanical strength, it adds to the holding effect of the glass fragments by the inner protective film, while it is still maintaining its original shape as a whole with the consequence that the scattering glass fragments can be perfectly avoided. In the case of a glass bottle having no internal pressure, the inner film well holds the glass fragments at the time of breakage of the glass bottle due to external impact, and the outer protective film increases the holding effect by the inner film without it being broken in any portion thereof, so that no scattering of the glass fragments can take place.

Now, the method of forming the protective film on the external wall surface of glass bottles according to the present invention will be described hereinbelow.

First of all, the inner layer liquid such as a natural rubber solution or latex, a diene type synthetic rubber solution or latex, a plastisol or an organosol or powder of polyvinyl chloride, or a vinyl chloride/vinyl acetate copolymer solution is applied onto the surface of the glass bottle to be coated by means of a dipping method, spraying method, etc. to a thickness of coating of from 50 to 200 microns, or more preferably between 80 and 140 microns. Vulcanized natural rubber latex and diene type synthetic rubber latex are vulcanized at room temperature or dried. Plastisols or organosols of polyvinyl chloride, and vinyl chloride vinyl acetate copolymers are gelatinated by heating them at a temperature of, for example, 170° C. for 10 minutes. During this vulcanization or drying process, the volume of the layer liquid coated on the surface of the bottle is reduced due to the volatilization of the solvent to slightly constringe the glass bottle.

Subsequently, the outer layer liquid of high polymer solution such as an epoxy resin, a one-component type moisture-sensitive polyurethane, polyurethane rubber added with a hardening agent, a polycarbonate, a polyester, a polystyrene, or an ethylene/vinyl acetate copolymer is applied over the surface of the inner film as well as the glass bottle in some part to a coating thickness of from 50 to 100 microns by means of the dipping method or spraying method. Epoxy resins and polyurethane rubbers added with a hardening agent are cured by heating at a temperature range of, for example, from 100 to 120° C. for 30 minutes. Polyurethane added with a hardening agent and a one component type moisture sensitive polyurethane are cured at room temperature. Polycarbonates, polyesters, polystyrenes and ethylene/vinyl acetate copolymers form their protective covering film simply by evaporation of the solvent.

In coating the wall surface of the glass bottle with the inner elastic film, the so-called "fluidized dipping method" is employed wherein a synthetic resin powder is placed in a fluidizing tank, and air is sent into the tank through a perforated bottom plate within the tank to maintain the synthetic resin powder in a fluidized state. Into this fluidized tank is dipped a glass bottle in a heated state at a temperature higher than the melting point of the resin powder to fusion-bond the fluidized resin powder adhered on the bottle surface, thereby obtaining a uniform coating.

For obtaining a coated film of uniform thickness by the abovementioned methods, the glass bottle, on which the liquid layer is coated, is held substantially horizontally and heat-treated or simply dried, while it is being rotated.

The effects of the present invention as has been described in the foregoing are as follows.

1. When the glass bottle, particularly the glass bottle of beer and carbonated beverages having internal gas pressure are broken by the internal pressure thereof or any external force, the coated inner elastic film elongates to separate from the glass bottle surface or floats up therefrom, and, at the same time, a portion of the outer protective film which, with the inner elastic film, prevents the glass fragments from scattering, slightly breaks open to permit the pressurized gas within the bottle to be released outside, thereby equalizing the pressure inside and outside the bottle. Further, as the outer protective film substantially maintains its original shape, the glass fragments may either be held by the inner protective film, or drop down within the coated bottle, whereby scattering of the glass fragments around the adjacent area can be perfectly prevented. When the glass bottles have no internal gas pressure, such as those containing milk and various other provisions are broken by external impact, the inner elastic film having moderate adhesion maintains the glass fragments, or holds the glass fragments at one end like hinges, thereby preventing scattering of such glass fragments. In any case, no harm is caused to human bodies as glass fragments do not scatter.

2. Since the inner elastic film maintains its elasticity even under cold conditions, such as in an ice-box or cold climate and the outer protective film maintains its high mechanical strength even in a hot climate, the glass bottle coated wtih the multi-protective film of the present invention retains the above-mentioned effect to prevent the scattering of glass fragments when the glass bottle breaks under various conditions.

3. Since the coated outer protective film of high mechanical strength covers the entire surface of the inner elastic film, undesirable scratching caused during the bottling and packaging as well as by collision of the bottles during handling can be minimized.

4. As a high polymer substance of excellent water-resistant and chemical-resistant properties is used as the coated outer protective film, swelling and embrittlement of the coated film surface can be prevented from occurring in the process of bottle-washing, degreasing, sterilization, etc.

5. When the inner and outer protective films are transparent and are closely contacted to the bottle surface under normal conditions, any mark or symbol on the bottle surface can be clearly seen through the transparent film without difficulty. In particular, those marks and symbols directly printed on the bottle surface can be seen with three-dimensional effect due to irregular reflection on the printed surface being absorbed by the coated films, hence the printed surface can be seen with more clarity. clarity.

6. Coating of the glass bottle with the protective films according to the present invention can be put into practice at a very low cost, and, moreover, lends itself to high safety of the bottles.

7. When the coated protective films becomes stained, the surface of the outer film is slightly cut and the bottle is dipped in hot water or in a solution of a surfactant, whereupon the inner film can be easily peeled off the bottle surface, and new protective films can be coated on the glass bottle for repeated use.

8. In case the coated bottle according to the present invention is used for bottling poisonous substances, even when the bottle is broken due to any external impact, the content does not easily flow out, as it is hindered by the protective films.

PREFERRED EMBODIMENTS

In order to enable persons skilled in the art to reduce the present invention as has so far been described into practice, the following actual examples of the invention are presented. It should, however, be noted that the invention is not limited to these examples alone, since any change and modification thereof may be made within the ambit of the invention as set forth in the appended claims.

Example 1

Two kinds of liquid for the inner and outer layers were prepared in accordance with the following recipes.

(Inner Layer Liquid): Wt. parts
Vulcanized natural rubber latex having 67% of solid content—"Revultex," product of Revertex Ltd., England _____ 100
Water _____ 170

(Outer Layer Liquid):
Epoxy resin principally composed of 2,2-bis [4-(2',3'-epoxypropoxy)phenol]-propane having molecular weight of 600–"Epikote #828," product of Shell Chemical Co., Ltd. _____ 100
Curing agent composed of condensation product of dimers of unsaturated fatty acid and alkyl-amine—"Versamid #115," product of General Mills, Inc., Ind. Chemical Division, U.S.A. __ 100
Solvent (methyl-ethyl ketone) _____ 70

At first, a glass bottle which had previously been cleansed and degreased was dipped once in the inner layer liquid, and then dried at room temperature to cause an inner covering film of about 80 microns thick to be formed onto the external wall surface of the bottle.

The bottle was then dipped once in the outer layer liquid, and, after volatilization of methylethyl ketone at a room temperature, placed for about 30 minutes in a heating apparatus at 120° C. to cure the epoxy resin, thereby forming a uniform protective covering film of about 100 microns thick, having a smooth surface without pin holes.

The physical properties of the film used in this Example were as follows.

| | Tensile strength (kg./cm.$^2$) | Elongation, percent | Water resistance |
|---|---|---|---|
| Inner film | 200 | 800 | Slightly poor. |
| Outer film | 230 | 150–220 | Excellent. |

Although the water-resistance of the inner film was slightly poor, as it was entirely covered with the outer film, there were no practical disadvantages, but it showed excellent water-resistance as a whole.

Example 2

The liquid for the inner layer was prepared in accordance with the following recipe.

The liquid for the outer layer was exactly same as that of Example 1 above.

(Inner Layer Liquid): Wt. parts
Vulcanized natural rubber latex having 67% of solid content—"Revultex," a product of Revertex Ltd., England _____ 100
Polyvinyl acetate latex having 30% of solid content—"Polisol S–3," product of Showa Highpolymer Co., Ltd., Japan _____ 50
Nonionic surface active agent—"Emalgen 105," a product of Nippon Oils & Fats Co. Ltd., Japan _____ 1
Water _____ 110

The inner layer liquid was prepared in accordance with the mixing quantity as specified above using the nonionic surface active agent as a stabilizer as well as an agent to prevent the adhesion of the film to the bottle surface.

The inner (or first) layer liquid was sprayed onto a glass bottle whose surface had been previously cleansed and degreased, and then the layer was dried at room temperature to cause an inner film of about 140 microns thick to be formed on the glass surface in an intimately contacted state.

The glass bottle provided with the inner film was then dipped into the outer layer liquid, and, after volatilization of methylethyl ketone at a room temperature, placed for about 30 minutes in a heating apparatus at 120° C. to cure epoxy resin, thereby forming a uniform protective covering film of about 100 microns thick having smooth surface and free from pin holes.

The physical properties of the inner film used in this Example was as follows.

Tensile strength (kg./cm.$^2$) _____ 250
Elongation (percent) _____ 450
Water resistance _____ Excellent

Example 3

The inner layer liquid was prepared in accordance with the following recipe.

The outer layer liquid was exactly same as that of Example 1 above.

(Inner Layer Liquid):                       Wt. parts
   Styrene-butadiene block copolymer rubber—"Cariflex TR 1102," product of Shell Chemical Co., Ltd. _____ 100
   Solvent (toluene) _____ 400

At first, a glass bottle whose surface had been previously cleansed and degreased was dipped once in the inner layer liquid, and then the inner protective film of about 100 microns thick was formed thereon by warm air drying.

The coating of the outer layer was carried out in exactly the same manner as in Example 1, and the outer protective coating film having an outer appearance and thickness the same as that of Example 1 could be obtained.

The physical properties of the inner film used in this Example were as follows.

Tensile strength (kg./cm.$^2$) _____ 300
Elongation (percent) _____ 880

Example 4

The inner layer liquid was prepared in accordance with the following recipe.

The outer layer liquid was exactly same as that of Example 1 above.

(Inner Layer Liquid):                       Wt. parts
   Styrene-butadiene block copolymer rubber—"Tufprene," product of Asahi Chemical Industry Co., Ltd., Japan _____ 100
   Silicone oil—"KF-96L" product of The Shinetsu Chemical Industry Co., Ltd., Japan ____ 0.2
   Solvent (toluene) _____ 400

A glass bottle whose surface had been previously cleansed and degreased was dipped in the inner layer liquid and subsequently in the outer layer liquid in the same way as in Example 1. Drying and heating were also conducted in the same way as in Example 1, thereby forming the uniform protective covering film consisting of the inner film of about 100 microns thick and the outer film of about 100 microns thick having a smooth surface without pin holes.

The physical properties of the inner film used in this Example were as follows.

Tensile strength (kg./cm.$^2$) _____ 320
Elongation (percent) _____ 800

EXAMPLE 5

Both the inner and the outer layer liquids were prepared in accordance with the following recipes.

(Inner Layer Liquid):                       Wt. parts
   Polyvinyl chloride paste resin—"Geon 121L," product of The Japanese Geon Co., Ltd., Japan _____ 100
   Plasticizer (dioctyl phthalate), product of Sekisui Chemical Co., Ltd., Japan _____ 80
   Stabilizer (dibutyl tin maleate), "TVS #86-P," product of Nitto Kasei K.K., Japan _____ 0.5
(Outer Layer Liquid):
   One component type, moisture sensitive polyurethane (a prepolymer of polyester-polyurethane having organic isocyanate terminal group)—"Chemglaze Z 001," product of Shinto Paint Co., Ltd., Japan _____ 100
   Solvent (xylene), product of Idemitsu Kosan Co., Ltd., Japan _____ 400

The inner layer liquid of plastisol was prepared by mixing the abovementioned three components at the specified recipe using an ink roll, after which the mixture was defoamed in a vacuum defoaming machine.

A glass bottle, the surface of which had been previously cleaned and degreased, was preheated to a temperature of from about 140 to 160° C., then dipped into the inner layer liquid, pulled up, and drained of the excessive liquid by hanging the bottle for 2 to 3 minutes. Subsequently, the glass bottle was placed in a heating apparatus at 170° C., for 10 minutes to gelantinate the plastisol coating whereby a protective film of uniform thickness of about 100 microns was formed on the surface of the glass bottle.

Next, the bottle coated with the inner film was cooled to a temperature of below 60° C., and dipped into the outer layer liquid, pulled up, and dried for about one hour at a room temperature, whereby a protective film having smooth surface of uniform thickness of about 100 microns without pin hole was formed over the inner protective film.

The physical properties of the films used in this Example were as follows.

| | Tensile strength (kg./cm.$^2$) | Elongation (percent) |
|---|---|---|
| Inner film | 180 | 420 |
| Outer film | 480 | 300 |

Example 6

The following three kinds of liquid were prepared.

(Primer Liquid):                           Wt. parts
   Carboxyl-group-introduced vinyl-chloride/vinyl acetate copolymer—"Geon 400 x 110A," product of The Japanese Geon Co., Ltd. ____ 100
   Plasticizer (dioctyl phthalate), product of Sekisui Chemical Co., Ltd., Japan _____ 70
   Stabilizer (dibutyl tin maleate), TVS #86-p, product of Nitto Kasei K.K., Japan _____ 0.5
(Inner Layer Liquid):
   Polyvinyl chloride paste resin—"Geon 121L," product of The Japanese Geon Co., Ltd., Japan _____ 100
   Plasticizer (dioctyl phthalate), product of Sekisui Chemical Co., Ltd., Japan _____ 80
   Stabilizer (dibutyl tin maleate), TVS #86-p, product of Nitto Kasei K.K., Japan _____ 0.5
   Solvent (xylene), product of Idemitsu Kosan Co., Ltd., Japan _____ 30
(Outer Layer Liquid):
   One component type, moisture sensitive polyurethane (a prepolymer of polyester-polyurethane having organic isocyanate terminal group)—"Chemglaze Z 001," product of Shinto Paint Co., Ltd., Japan _____ 100
   Solvent (xylene), product of Idemitsu Kosan Co., Ltd., Japan _____ 400

Those components except for the solvent for the inner and outer layer liquids were mixed thoroughly by an ink roll in accordance with the above specified recipes to prepare the respective liquids. The solvent for the inner and outer layer liquids was added after the ink-roll mixing and the whole batch was then agitated by a stirrer, into a sol, after which it was defoamed by a vacuum defoaming machine.

A glass milk bottle with a wide neck whose surface had been previously cleansed and degreased was dipped into the primer liquid, pulled up quickly, and drained of the excessive liquid by hanging it for 2 to 3 minutes.

The bottle was then dipped once into the inner layer liquid, pulled up, and drained of the excessive liquid by hanging it for about 10 minutes in an air-circulation chamber with simultaneous volatilization of zylene as the solvent. After the thorough volatilization of xylene, the bottle was placed in a heating apparatus at 170° C. for 10 minutes to gelatinate the organosol, whereby a uniform inner protective covering film of about 80 microns was formed.

The bottle coated with the inner film was then dipped into the outer layer liquid, pulled up, and dried for about one hour at room temperature. As the result, an outer protective film having a smooth surface, a uniform thickness of about 100 microns, and free from pin holes was formed.

The physical properties of the films used in this Example were as follows.

|  | Tensile strength (kg./cm.²) | Elongation (percent) |
|---|---|---|
| Inner film | 170 | 420 |
| Outer film | 480 | 300 |

Example 7

The inner and outer layer liquids were prepared in accordance with the following recipes.

(Inner Layer Liquid): Wt. parts
Vinyl chloride-vinyl acetate copolymer—"Geon 400 x 150ML," product of The Japanese Geon Co., Ltd. _____ 20
Solvent (acetone) product of Idemitsu Kosan Co., Ltd. _____ 80
(Outer Layer Liquid):
Polycarbonate—"Iupilon E 2000," product of Mitsubishi Gas-Chemical Co., Ltd., Japan ___ 20
Solvent (methylene dichloride) _____ 80

The solvent was added to the respective liquids after ink-roll mixing, and the whole batch was then agitated by a stirrer into an organosol, after which it was defoamed by a vacuum defoaming machine.

A glass bottle whose surface had been previously cleansed and degreased was dipped into the inner layer liquid, pulled up, and drained of the excessive liqud thoroughly by hanging it for about 1 hour at room temperature to volatilize the solvent. As a result, a protective film having uniform thickness of about 100 microns was obtained. Subsequently, the glass bottle coated with the inner film was dipped into the outer layer liquid, pulled up, and dried at a room temperature for about 1 hour. Thus, an outer protective film having smooth surface, uniform thickness of about 100 microns, and free from pin holes was formed.

The physical properties of the films used in this Example were as follows.

|  | Tensile strength (kg./cm.²) | Elongation (percent) |
|---|---|---|
| Inner film | 330 | 350 |
| Outer film | 520 | 150 |

Example 8

Both inner and outer layer liquids were prepared in accordance with the following recipes.

(Inner Layer Liquid): Wt. parts
Styrene-butadiene block copolymer rubber—"Cariflex TR 1102," product of Shell Chemical Co., Ltd. _____ 100
Solvent (toluene) _____ 400
(Outer Layer Liquid):
Polystyrene—"Piccolastic D," product of Esso Standard Oil Co. _____ 15
Solvent (hexane) _____ 85

A glass bottle whose surface had been previously cleansed and degreased was dipped in the inner layer liquid and then dried at room temperature to obtain an inner protective film of about 80 microns thick which intimately contacted the bottle wall surface.

The bottle coated with the inner film was further dipped in the outer layer liquid, pulled up, and dried at a room temperature, whereby a uniform outer protective film of about 100 microns thick having a smooth surface and free from pin holes was formed.

The physical properties of the films used in this Example were as follows.

|  | Tensile strength (kg./cm.²) | Elongation (percent) |
|---|---|---|
| Inner film | 300 | 880 |
| Outer film | 400 | 80 |

Example 9

Both inner and outer layer liquids were prepared in accordance with the following recipes.

(Inner Layer Liquid): Wt. parts
Styrene-butadiene block copolymer rubber—"Cariflex TR 1102," product of Shell Chemical Co., Ltd. _____ 100
Solvent (toluene) _____ 400
(Outer Layer Liquid):
Styrene monomer-containing polyester composed of polycondensation product of maleic acid and glycol—"Polymal 3214 AP," product of Takeda Chemical Industries, Ltd., Japan (styrene content 5–12%) _____ 60
Styrene monomer-containing polyester composed of polycondensation product of maleic acid and glycol—"Polymal 3218 AP," product of Takeda Chemical Industries, Ltd. (styrene content 5–12%) _____ 40
Curing agent composed of methyl ethyl ketone peroxide—"Rupasol DDM," product of Yoshitomi Pharmaceutical Industries, Ltd., Japan __ 1
Solvent (toluene) _____ 30

At first, a glass bottle whose surface had been previously cleansed and degreased was dipped once in a inner layer liquid, and then an inner protective film of about 100 microns thick was formed thereon by warm air drying.

Next, the bottle coated with the inner film was dipped into the outer layer liquid, pulled up, and after volatilization of toluene at a room temperature, placed in a heating apparatus at 120° C. for about 30 minutes to cure the polyester resin, thereby forming a uniform protective outer film of about 80 microns thick having a smooth surface without pin holes.

The physical properties of the film used in this Example were as follows.

|  | Tensile strength (kg./cm.²) | Elongation (percent) |
|---|---|---|
| Inner film | 300 | 880 |
| Outer film | 300 | 150 |

Example 10

Both inner layer powder and outer layer liquid were prepared in accordance with the following recipes.

| (Inner Layer Powder): | Wt. parts |
|---|---|
| Vinyl chloride resin "Geon 103 EP-8," product of The Japanese Geon Co., Ltd. | 100 |
| Plasticizer (dioctyl adipate) product of Sekisui Chemical Co., Ltd., Japan | 50 |
| Stabilizer (dibutyl tin maleate), TVS #86-P, product of Nitro Kasei K.K. | 1 |
| (Outer Layer Liquid): | |
| Epoxy resin (a condensation product of bisphenol A and epichloro-hydrin)—"DER 331 J," product of Dow Chemical Co. | 100 |
| Curing agent (a modified amine consisting of heterocyclic diamine)—"Epomate C 002" product of Ajinomoto Co., Inc. | 50 |
| Solvent: | |
| (Toluene) | 100 |
| (Isobutanol) | 70 |

The inner layer powder was prepared by the so-called "dry-blend" method, wherein the abovementioned components are poured into a Henschel mixer and heated, while being agitated, to be rendered into gel.

The dry-blended gel particles were fed into a coating chamber, and, while the particles were being floated within the chamber, a glass bottle which has just been manufactured and still kept at a temperature of 180 to 200° C. is placed in this chamber. The dry-blend powder on the bottle surface were melted by the heat of the bottle, whereby a continuous coating of about 70 microns thick was formed thereon. Subsequently, the bottle was cooled to a temperature of 50 to 70° C., and dipped into the outer layer liquid which is a toluene/isobutanol mixed solution of epoxy resin added with a curing agent. After pulling up of the bottle from the liquid bath, the solvent in the solution was evaporated and the liquid layer on the bottle surface was cured by heating it at a temperature of 100° C. for 30 minutes, whereby the outer protective film of 100 microns thick was formed over the inner protective film.

It was observed that, while the inner protective film formed by melting the dry-blend particles of the inner layer powder was somewhat rough in its surface, a smooth, lustrous surface of the protective film could be obtained with the outer protective film.

The physical properties of the films used in this Example were as follows.

| | Tensile strength (kg./cm.$^2$) | Elongation (percent) |
|---|---|---|
| Inner film | 100 | 320 |
| Outer film | 260 | 180 |

Example 11

Both inner and outer layer liquids were prepared in accordance with the following recipes.

| (Inner Layer Liquid): | Wt. parts |
|---|---|
| Styrene-butadiene block copolymer—"Cariflex TR 1102," product of Shell Chemical Co., Ltd. | 100 |
| Solvent (toluene) | 400 |
| (Outer Layer Liquid): | |
| Polyurethane prepolymer—"Adiprene L-100," product of E. I. du Pont de Nemours & Co. | 100 |
| Curing agent—"Moca," product of E. I. du Pont de Nemours & Co. | 15 |
| Solvent (toluene) | 1,200 |

The outer layer liquid thus prepared is kept at a temperature below 5° C.

A glass bottle whose surface had been previously cleansed and degreased was dipped once in the inner layer liquid, pulled up, and dried at a room temperature, whereby an inner protective film of approximately 100 microns thick intimately contacting the bottle surface was obtained.

The bottle coated with the inner film was further dipped once in the outer layer liquid, pulled up, and, after evaporation of toluene at room temperature, heated in a heating apparatus at a temperature of 100° C. for about 30 minutes to cure polyurethane. As the result, the outer protective film of 50 microns thick and having a smooth film surface without any pin holes whatsoever could be obtained.

The physical properties of the films used in this Example were as follows.

| | Tensile strength (kg./cm.$^2$) | Elongation (percent) |
|---|---|---|
| Inner film | 300 | 880 |
| Outer film | 510 | 330 |

It was observed from the glass bottle obtained by the foregoing Examples 1 through 10 inclusive that, when the bottles coated with inner and outer protective films of 180 to 200 microns thick in total and filled with carbonated beverage exerting an internal gas pressure of 4 kg./cm.$^2$ against the bottle wall (according to Examples 1-5 and 7-10) and a milk bottle coated with the same protective films and filled in with milk (according to Example 6) were dropped onto concrete floor from a height of 1.5 meters, no fragments of the broken glass bottle scattered around the surrounding area.

For the sake of comparison, when a bare bottle not coated with the protective films was dropped under the same conditions as above, glass fragments scattered out into a distance of 8 meters from the dropped point as the center.

What I claim is:

1. A glass bottle coated with a multi-layer covering protective film on its surface to prevent broken glass fragments of said bottle from scattering around which comprises:
    a. a glass bottle
    b. an inner coated film of a high polymer intimately contacted on the external wall surface of said glass bottle; and selected from the group consisting of natural rubber, diene type synthetic rubbers, which are based on homopolymers or copolymers of a conjugated diene monomer and homopolymers and copolymers of vinyl chloride, said inner film having an adhesive strength of 0.1 kg./cm. to 3.0 kg./cm. with respect to the glass bottle and wherein the film is capable of being stretched or elongated to an extent greater than 150% of the original length of the film; and
    c. an outer protective coated film of a synthetic resin covering the entire surface of said inner film and a part of the glass bottle surface, and selected from the group consisting of epoxy resins, polyurethanes, polycarbonates, polyesters, polystyrenes and ethylene/vinyl acetate copolymers, said outer film having a mechanical strength greater than about 200 kg./cm.$^2$, high breakage resistance, wet and dry scratch-resistance, water-resistance, chemical resistance, oil-resistance, and weather-resistance, and wherein there is moderate adhesive strength between the inner film and the outer film.

2. A glass bottle according to claim 1 wherein the inner film has a thickness of from 50 to 200 microns and the thickness of the outer film is from 50 to 100 microns.

3. A glass bottle according to claim 1 wherein the inner film is natural rubber having a mechanical strength of 100 to 300 kg./cm.$^2$.

4. A glass bottle according to claim 1 wherein the inner film is a diene type synthetic rubber having a mechanical strength of 100 to 300 kg./cm.$^2$ and is selected from the group consisting of styrene/butadiene block copolymers, acrylonitrile/butadiene rubber copolymers and polychloroprene.

5. A glass bottle according to claim 1 wherein the inner film is a homopolymer of vinyl chloride.

6. A glass bottle according to claim 1 wherein the inner film is a vinyl chloride/vinyl acetate copolymer.

7. A glass bottle according to claim 1 wherein the inner film is selected from the group consisting of natural rubbers, diene type synthetic rubbers and vinyl chloride/vinyl acetate copolymers and the outer film is selected from the group consisting of polyesters and polycarbonates.

8. A glass bottle according to claim 1 wherein the inner film is selected from the group consisting of natural rubber, diene type synthetic rubbers, vinyl chloride homopolymers and the outer film is an ethylene/vinyl acetate copolymer.

9. A glass bottle according to claim 1 wherein the inner film is selected from the group consisting of natural rubber, diene type synthetic rubbers, vinyl chloride homopolymers and vinyl chloride/vinyl acetate copolymers, and the outer film is selected from the group consisting of epoxy resins, polycarbonates, polyurethanes and polystyrenes.

10. A glass bottle according to claim 9 wherein the outer film is a polyurethane.

References Cited
UNITED STATES PATENTS

| | | | |
|---|---|---|---|
| 3,715,232 | 2/1973 | Audesse et al. | 117—94 |
| 3,457,095 | 7/1969 | Doering et al. | 117—94 |
| 3,212,915 | 10/1965 | Hackett et al. | 117—21 |
| 3,362,843 | 1/1968 | Smith et al. | 117—94 |
| 3,379,559 | 4/1968 | Gerhardt | 117—72 |
| 3,713,867 | 1/1973 | Parkinson et al. | 117—94 |
| 3,415,673 | 12/1968 | Clock | 117—72 |
| 3,471,312 | 10/1969 | Muenchinger et al. | 117—72 |

WILLIAM D. MARTIN, Primary Examiner

W. R. TRENOR, Assistant Examiner

U.S. Cl. X.R.

117—77, 94, 123 D, 133, 162; 215—Dig. 6

UNITED STATES PATENT OFFICE
CERTIFICATE OF CORRECTION

Patent No. 3,823,032          Dated July 9, 1974

Inventor(s) Nobuo Ukai

It is certified that error appears in the above-identified patent and that said Letters Patent are hereby corrected as shown below:

Page one, first column, below the line reading "Filed July 27, 1972, Ser. No. 275,741", insert the following:

--     Foreign Application Priority Data

August 13, 1971    Japan . . . . . 618,56/1971 --.

Signed and sealed this 6th day of May 1975.

(SEAL)
Attest:

RUTH C. MASON
Attesting Officer

C. MARSHALL DANN
Commissioner of Patents
and Trademarks